Aug. 13, 1929.  W. COSTELLO, JR  1,724,827
VACUUM ROTARY CAKE MACHINE
Filed March 18, 1927
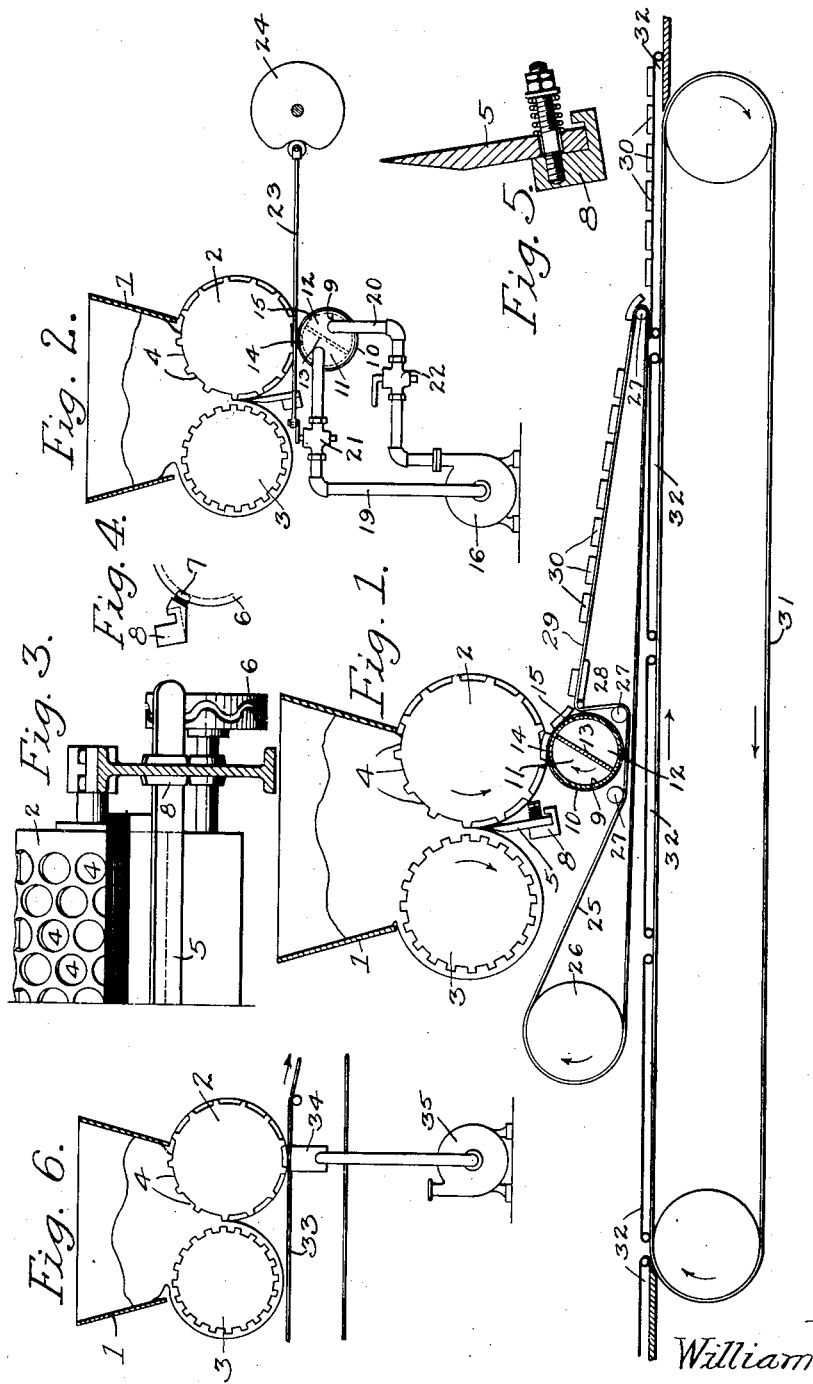
Inventor,—
William Costello, Jr,
by his Attorneys,
Howson & Howson.

Patented Aug. 13, 1929.

1,724,827

UNITED STATES PATENT OFFICE.

WILLIAM COSTELLO, JR., OF PHILADELPHIA, PENNSYLVANIA.

VACUUM-ROTARY CAKE MACHINE.

Application filed March 18, 1927. Serial No. 176,420.

This invention relates to improvements in cake machines of the type employed in the manufacture of small cakes or crackers.

The principal object of the invention is to provide novel apparatus for separating predetermined relatively small portions of dough from the mass and for depositing these portions in individual pieces of proper size and shape on trays upon which the cakes are baked.

A more specific object of the invention is to provide novel means for separating the individual dough pieces from a forming cylinder without marking or otherwise adversely affecting the appearance of the cakes or crackers.

The invention further resides in certain novel and advantageous structural and operative features hereinafter set forth and illustrated in the attached drawings, in which:

Figure 1 is a diagrammatic sectional view of apparatus made in accordance with my invention;

Fig. 2 is a similar view showing details of the apparatus;

Fig. 3 is a fragmentary elevation showing details of the mounting and operation of the cutting blade;

Fig. 4 is a partial elevation of the parts shown in Fig. 3;

Fig. 5 is a transverse sectional view of the cutting blade, and

Fig. 6 is a view illustrating a modification within the scope of the invention.

Referring to the drawings, the apparatus comprises a hopper 1, at the bottom of which is mounted for rotation a pair of cylinders 2 and 3, the cylinders being so arranged that the contents of the hopper rest directly upon and are normally retained by the said cylinders, as clearly shown in Fig. 1. The cylinder 2 is provided with a plurality of independent peripheral recesses 4, while the periphery of the cylinder 3 is preferably corrugated or otherwise roughened in order to more readily take hold of the dough contents of the hopper. The cylinders 2 and 3 are rotated as indicated by the arrows in Fig. 1, with the result that batter or other substance in the hopper 1 is passed downwardly between the cylinders and is forced into the recesses 4 of the cylinder 2.

Located directly below and between the cylinders 2 and 3 is a blade 5, the upper shearing edge of which contacts with the periphery of the cylinder 2 and functions to separate the dough passing downwardly between the cylinders from the face of the cylinder 2, with the exception of those portions which occupy the recesses 4. The mass of batter separated from the cylinder 2 and passing between the cylinders adhers to the corrugated or roughened face of the cylinder 3 and is carried back to the hopper. It will be noted that this portion of the apparatus functions continuously to fill the recesses 4 in the cylinder 2 with batter.

The function of the blade 5 is aided by longitudinal reciprocatory movement impressed upon the blade through the medium of a cam 6. This cam is operatively connected with the blade through a roller 7 on the blade bracket 8, as shown in Fig. 4, the roller projecting into the cam groove, which latter is so formed as to give the bracket the desired movement. The movement of the blade gives a slicing effect insuring a correct function. Preferably the blade 5 is resiliently mounted on the bracket 8, as shown in Fig. 5.

Directly below the cylinder 2 is a hollow suction cylinder 9, and this cylinder is surrounded by a perforated sleeve 10 which is adapted to rotate on the cylinder 9 in the direction indicated by the arrow in Fig. 1. As clearly illustrated, the cylinder 9 is divided into two chambers 11 and 12 by means of a partition 13, and the chamber 11 is provided with one or a number of apertures 14 located at the point in the cylinder nearest the cylinder 2 and extending the entire length of the latter cylinder. Similarly the chamber 12 is provided with a corresponding port or series of ports 15.

As shown in Fig. 2, a suitable fan or blower 16 is provided, the intake of which is connected through a pipe 19 with the chamber 11 of the cylinder 9, while the exhaust of the blower is connected through a pipe 20 with the chamber 12. Under these circumstances, it will be apparent that the chamber 11 is continually being evacuated, while the chamber 12 is under pressure. The degree of suction on the chamber 11 may be controlled through the medium of a valve 21 in the duct 19, while the pressure within the chamber 12 may be controlled by a valve 22 in the duct 20. In the present instance, the valve 21 is operatively connected through a rod 23 with a cam 24 for a purpose hereinafter described.

Again referring to Fig. 1, it will be noted that the apparatus comprises an endless conveyer 25 which passes around an actuating roller 26 and is guided by rolls 27, 27 and a suitable guide 28 close to the periphery of the sleeve 10 at a point immediately adjacent the row of ports 15 in the cylinder 9. The roller 26 is rotated in the direction of the arrow in Fig. 1 so that that section of the conveyer designated by the reference numeral 29 is moving away from the suction roll 9. With the foregoing arrangement, the suction in the chamber 11 acting through the ports 14 and through the perforated sleeve 10 tends to draw the dough from the recesses 4 in the cylinder 2 as the cylinder in rotating brings the individual recesses into a position directly over the ports 14 in the cylinder 9. The molded pieces being drawn from the recesses 4 travel on the rotating perforated sleeve 10 until they come into a position directly over the ports 15 in the chamber 12. Sufficient pressure is maintained within the chamber 12 to force the pieces from the sleeve 10 so that they are taken up by the conveyer 25. The operation of this portion of the mechanism will be readily understood from Fig. 1 of the drawings, in which the individual molded pieces withdrawn from the recesses 4 of the cylinder 2 are designated by the reference numeral 30.

Immediately below the conveyer 25 is a second conveyer 31 which moves in the direction indicated by the arrows in Fig. 1, this conveyer functioning to advance under the forward end of the conveyer 25 trays 32 which receive the molded pieces 30, as clearly illustrated in Fig. 1. These trays may then be removed to the ovens.

In order to prevent the pieces 30 from being deposited at the juncture of any two of the trays 32, the suction valve 21 is closed periodically through the medium of the cam 24 described above. During the period that the valve 21 is closed, the suction part of the cylinder is inoperative to withdraw the dough from the recesses 4, and the cam 24 operates synchronously with the movement of the trays 32 in obvious manner and as illustrated, so that the pieces are fed accurately to the pans.

In Fig. 6, I have shown a modification of the device in which the suction roll 9 is eliminated. In this instance, a perforated belt or conveyer 33 is passed directly below the cylinder 2, and directly below the conveyer 33 and the roller 2 is located a suction box 34 connected with the intake of a suitable blower or fan 35. In this instance, the suction withdraws the dough pieces from the recesses 4 of the cylinder 2 and onto the belt 33, which carries them away to eventually deposit them on the trays 32.

I claim:

1. In a cake machine, the combination with a roller having peripheral recesses, of means for filling said recesses with dough, a perforated sleeve in contact with the face of said roller, suction means operating through said sleeve to withdraw the dough from the recesses of the said roller, means for rotating the sleeve, fluid pressure means also operating through said sleeve to remove the molded pieces from the latter, and a conveyer adapted to receive said molded pieces from the rotary sleeve.

2. In a cake machine, the combination with a roller having peripheral recesses, of means for filling said recesses with dough, a bichambered cylindrical container located adjacent the roller, a perforated sleeve rotatably mounted on the said container, ports in one of the chambers of said container immediately adjacent the said roller, means for evacuating the ported chamber whereby suction operates through the port and through the perforated sleeve to withdraw the dough from the recesses of said cylinder, a port in the other chamber of said container over which the molded pieces withdrawn from the said recesses are carried by the perforated cylinder, means for applying fluid pressure to the interior of the last named chamber whereby a pressure is exerted through the said port therein and through the perforated cylinder tending to force the molded pieces away from the latter, and a conveyer operatively associated with said sleeve at a point adjacent the port in the last named chamber and adapted to receive the dough pieces forced from the sleeve.

3. In a cake machine, the combination with a rotary cylinder having peripheral recesses, of means for filling said recesses with dough, suction means operatively associated with the cylinder and adapted to withdraw the dough from the said peripheral recesses, means operatively associated with said suction means for conducting past the same a series of trays adapted to receive the molded pieces withdrawn from the said roller, a valve controlling the said suction means, and mechanism operating in timed relation with the movement of said trays for periodically closing the valve whereby the feeding of the molded pieces to the said trays is interrupted during the periods at which the adjacent ends of the trays are passing the receiving position.

4. In a cake machine, the combination with a roller having peripheral recesses, of means for filling said recesses with dough, a perforated sleeve in contact with the face of said roller, suction means operating through said sleeve to withdraw the dough from the recesses of said roller, means for receiving the molded pieces from said sleeve, and fluid pressure means for clearing the apertures of said sleeve of accumulated dough.

WILLIAM COSTELLO, JR.